(12) United States Patent
Lecke et al.

(10) Patent No.: US 6,651,452 B2
(45) Date of Patent: Nov. 25, 2003

(54) SWITCH CABINET OR COVER WITH AN AIR-CONDITIONING UNIT

(75) Inventors: Markus Lecke, Holzhausen (DE); Steffen Wagner, Burbach (DE)

(73) Assignee: Rittal Rudolf Loh GmbH & Co. KG, Herborn (DE)

( * ) Notice: Subject to any disclaimer, the term of this patent is extended or adjusted under 35 U.S.C. 154(b) by 0 days.

(21) Appl. No.: 10/204,804

(22) PCT Filed: Jan. 25, 2001

(86) PCT No.: PCT/EP01/00800
§ 371 (c)(1),
(2), (4) Date: Aug. 23, 2002

(87) PCT Pub. No.: WO01/63713
PCT Pub. Date: Aug. 30, 2001

(65) Prior Publication Data
US 2003/0010051 A1 Jan. 16, 2003

(30) Foreign Application Priority Data
Feb. 23, 2000 (DE) .......................................... 100 08 383

(51) Int. Cl.⁷ ............................ F25B 1/00; F25D 23/12; F25D 17/04
(52) U.S. Cl. ......................... 62/230; 62/259.2; 62/407
(58) Field of Search ................................ 62/259.2, 298, 62/404, 407, 230

(56) References Cited

U.S. PATENT DOCUMENTS 3,334,684 A * 8/1967 Roush et al. ................. 165/47
3,740,964 A * 6/1973 Herweg ........................ 62/262
5,069,041 A * 12/1991 Thielman et al. .............. 62/263
5,709,100 A * 1/1998 Baer et al. ................... 62/259.2
5,896,922 A   4/1999 Chrysler et al.
6,205,796 B1 * 3/2001 Chu et al. ....................... 62/94
6,400,567 B1 * 6/2002 McKeen et al. ............. 361/695

FOREIGN PATENT DOCUMENTS

| | | |
|---|---|---|
| CH | 658 511 | 11/1986 |
| DE | 1 135 065 | 8/1962 |
| DE | 22 35 564 | 1/1974 |
| DE | 30 03 398 | 8/1980 |
| DE | 31 36 226 | 3/1983 |
| DE | 90 03 687.5 | 7/1990 |
| DE | 297 17 480 | 3/1998 |
| DE | 196 41 552 | 11/1998 |

* cited by examiner

Primary Examiner—William C. Doerrler
(74) Attorney, Agent, or Firm—Pauley Petersen & Erickson

(57) ABSTRACT

The invention relates to a switch cabinet or cover with an air-conditioning unit, which comprises a cooling circuit system with an evaporator and a condenser. The evaporator has an integral air circuit, connected spatially with the interior of the switch cabinet and through which the air in the interior of the switch cabinet may be forced, by means of a blower. The condenser is in contact with the remaining components of the cooling circuit, by means of refrigerant lines. According to the invention, in order to reduce emissions from the air-conditioner, due to environmental damage considerations, the evaporator, together with the dedicated blower, is integrated in an evaporator unit, attached to the switch cabinet. The condenser, together with a dedicated blower, is integrated in a condenser unit, whereby the condenser unit is spatially separate from the evaporator unit and from the switch cabinet.

17 Claims, 1 Drawing Sheet

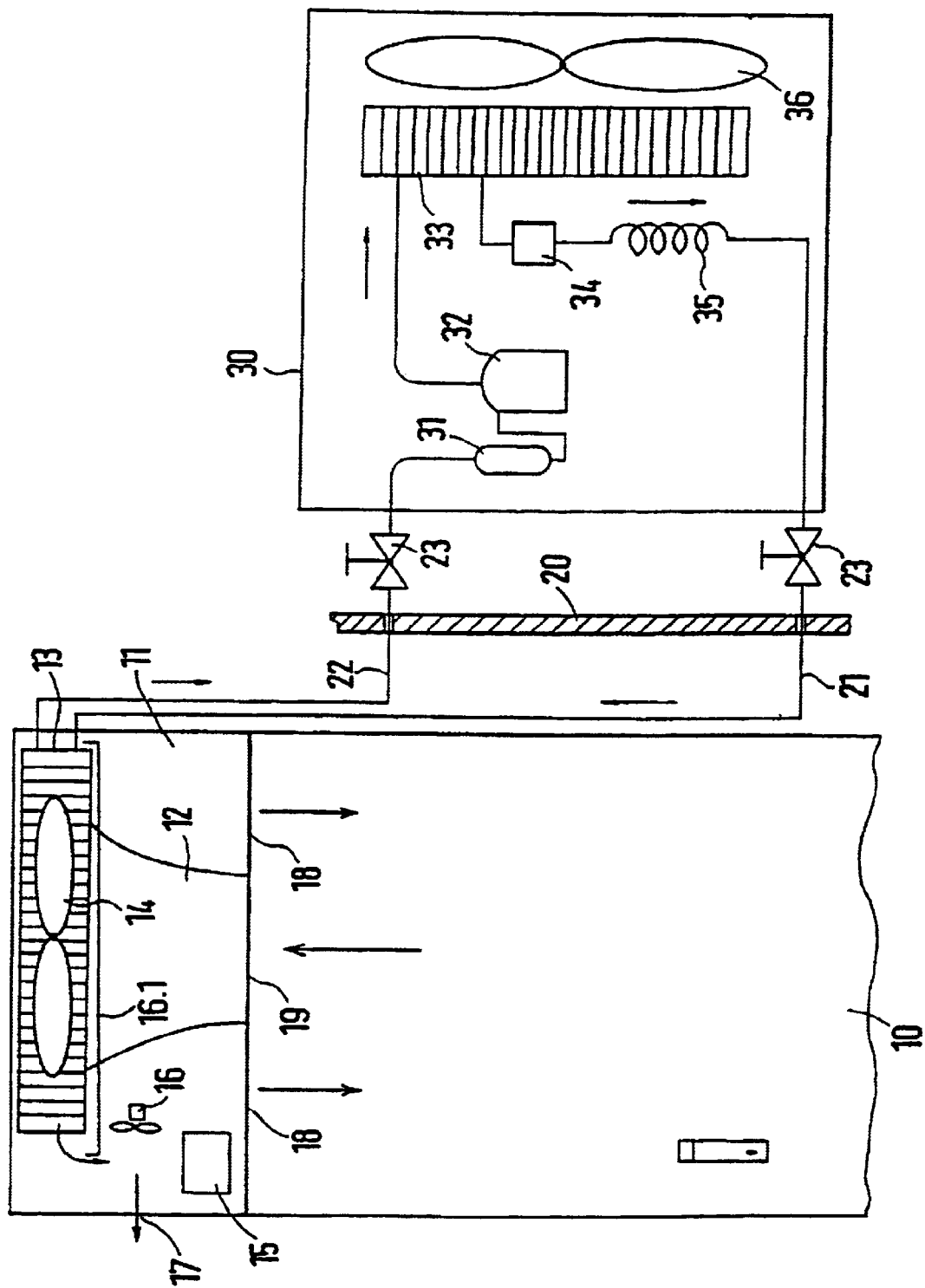

SWITCH CABINET OR COVER WITH AN AIR-CONDITIONING UNIT

BACKGROUND OF THE INVENTION

1. Field of the Invention

This invention relates to a switch cabinet or enclosure with an air-conditioning unit that contains a cooling circuit system with an evaporator and a condenser, wherein the evaporator has an integral air circuit that is spatially connected to the interior of the switch cabinet and through which the air of the switch cabinet interior can be conveyed by a blower, and wherein the evaporator is connected to the remaining components of the cooling circuit by refrigerant lines.

2. Discussion of Related Art

Switch cabinets of this type of are known from German Patent References DE 44 13 130 and DE 196 41 552. In this case, an air-conditioning unit with an air-conditioner housing is used. All components of the cooling circuit are accommodated in the air-conditioner housing. In certain instances, for example, if a switch cabinet is arranged in office or laboratory rooms, the air-conditioning unit is subject to special requirements. First, the air-conditioning unit should generate very little noise. In addition, it is usually undesirable to release the heat generated by the air-conditioning unit into the surrounding room.

SUMMARY OF THE INVENTION

One object of this invention is to provide a switch cabinet or enclosure of the type described above but in which the impact on the surroundings due to emissions from the air-conditioning unit is reduced.

This objective is achieved with an evaporator and a dedicated blower integrated into an evaporator unit that is arranged on the switch cabinet. The condenser and a dedicated blower are integrated into a condenser unit. The condenser unit is arranged spatially separate from the evaporator unit and spatially separate from the switch cabinet.

Because the condenser unit is separate from the evaporator unit, the condenser can be independently positioned. It is possible to arrange the condenser unit outside of the room in which the switch cabinet is arranged. With this arrangement, the thermal energy drawn from the switch cabinet by the evaporator unit can be conveyed to the condenser via the refrigerant. The condenser releases the thermal energy into the surroundings distant from the switch cabinet. Because the thermal energy is conducted away the room in which the switch cabinet is located, no reheating can occur, and thus the air-conditioning unit has a high degree of efficiency. This invention also makes it possible to arrange the air-conditioned switch cabinet in rooms that have only inferior ventilation, if any ventilation.

This invention also reduces noise generated by the air-conditioning unit.

The evaporator unit may be in the form of a cabinet roof unit or a wall unit or may be otherwise positioned on or in the switch cabinet.

According to one preferred embodiment of this invention, the evaporator unit is connected to the condenser unit by one incoming and one outgoing refrigerant line, wherein the refrigerant lines bridge the free space between the evaporator unit and the condenser unit. Couplings that respectively comprise two coupling parts are installed in the two refrigerant lines, wherein each coupling part is connected to the end of a refrigerant line in a pressure-tight fashion, and wherein the two coupling parts of a coupling can be connected or separated by a rapid-action closure. The couplings make it possible to handle and position the evaporator unit separately from the condenser unit. With the rapid-action closures, the line connections can also be produced by unskilled personnel.

In order to allow the installation of refrigerant lines without special skills and special tools, the incoming and outgoing refrigerant lines can be in the form of flexible conduits.

In one embodiment of this invention, the evaporator unit has a housing that accommodates the evaporator and is positioned on the roof of the switch cabinet or in the switch cabinet. The housing contains a central air inlet opening through which the air of the switch cabinet interior can be conveyed into the housing. Air outlet openings through which the cooled air can be conveyed from the housing into the switch cabinet interior are arranged laterally of the air inlet opening. The air outlet openings have adjustable air flow control that makes it possible to vary the air flow direction and/or the quantity of air conveyed. The air flow control makes it possible to achieve a targeted cooling in the switch cabinet interior.

According to another embodiment of this invention, the evaporator unit contains a condensate collector and a dedicated condensate evaporating device.

In order to generate as little noise as possible near the evaporator unit, the evaporator unit has a housing that accommodates the evaporator and can be attached to the roof of the switch cabinet. The housing contains a central air inlet opening through which the air of the switch cabinet interior can be conveyed into the housing, wherein air outlet openings through which the cooled air can be conveyed from the housing into the switch cabinet interior are arranged laterally of the air inlet opening, and wherein the air outlet openings have adjustable air flow control means that make it possible to vary the air flow direction and/or the quantity of air being conveyed.

In order to prevent components of the cooling circuit from becoming damaged when the couplings are separated, this invention provides a monitoring device assigned to the compressor, the monitoring device determines the power consumption of the compressor either at certain intervals or continuously, and the monitoring device switches off the compressor when a preset fixed value is exceeded. The refrigerant circulation is interrupted when the couplings are separated. In this case, the power consumption of the compressor increases, but only up to the preset fixed value at which the compressor is switched off.

If the incoming and outgoing refrigerant lines with a distribution element for connecting two or more evaporator units to one condenser unit, it is possible to supply a cooling circuit containing several evaporators with only one condenser unit.

BRIEF DESCRIPTION OF THE DRAWING

This invention is described in greater detail in view of one embodiment illustrated in the FIGURE, which shows a schematic view of a switch cabinet with an air-conditioning unit.

DESCRIPTION OF PREFERRED EMBODIMENTS

A switch cabinet 10 has a switch cabinet body with a flat roof area. An evaporator unit 11 of the air-conditioner is attached to this roof area. The evaporator unit 11 includes a housing that accommodates an evaporator 13 and a blower 14. A nozzle-shaped air flow guide 12 is associated with the evaporator 13. On an end that faces away from the evaporator 13, the air flow guide 12 opens into a central air inlet opening 19 of the housing. The air inlet opening 19 is spatially connected to the switch cabinet interior via the roof of the switch cabinet 10. Air flow guide regions that are assigned to air outlet openings 18 are formed in the housing of the evaporator unit 11, laterally of the central air flow guide 12. The air outlet openings 18 discharge into the switch cabinet interior. The arrows illustrated in the FIGURE indicate that air can be pulled by suction from the switch cabinet interior through the air inlet opening 19 by the blower 14. The air flows through the air flow guide 12 and reaches the evaporator 13. After the air flows through the evaporator 13, it emerges from the evaporator in the lateral region of the evaporator unit 11 housing. Subsequently, the air that was conditioned by the evaporator 13 is returned to the switch cabinet interior through the air inlet openings 19. The air inlet openings 19 have air flow control means that are not illustrated in greater detail in the FIGURE. The air flow control which is, for example, in the form of control flaps, varies the quantity of air being conveyed, as well as the air flow direction. A condensate evaporating device 15 in the form of a blower is also accommodated in the housing of the evaporator unit 11. The condensate evaporating device 15 evaporates the condensate accumulating on the evaporator 13 and discharges the evaporated condensate outward by a blower 16.

The switch cabinet 10 is arranged in a room that is symbolically illustrated in the form of a partition wall 20. A condenser unit 30 is arranged distant from this room. The condenser unit 30 has a housing body in which the condenser 33 and a blower associated with the condenser 33 are accommodated. In addition, an accumulator 31, a compressor 32, a filter 34 and an expansion valve 35 of the cooling circuit are accommodated in this housing body. The evaporator unit 11 is connected to the condenser unit 30 by refrigerant lines 21, 22. The refrigerant lines 21, 22 extend through the partition wall 20. The refrigerant lines 21, 22 are interrupted in the spatial region associated with the condenser unit 30. The refrigerant lines 21, 22 can be connected by couplings 23 in the vicinity of or near the separation points. In this embodiment, one coupling part is connected to each refrigerant line end. The two coupling parts of a coupling 23 can be connected to one another by a rapid-action closure. A conductive connection between the refrigerant line ends is produced once these coupling parts are connected to one another. The coupling 23 can be connected and separated without any leaks, for example no refrigerant is lost.

What is claimed is:

1. In a switch cabinet or enclosure with an air-conditioning unit that contains a cooling circuit system with an evaporator and a condenser, wherein the evaporator has an integral air circuit spatially connected to an interior of the switch cabinet and through which air of the switch cabinet interior is conveyed by a blower, and wherein the evaporator is connected to remaining components of the cooling circuit by refrigerant lines, the improvement comprising: the evaporator (13) and a dedicated blower (14) integrated into an evaporator unit (11) arranged on the switch cabinet (10), the condenser (33) and a dedicated blower (36) integrated into a condenser unit (30), the condenser unit (30) arranged spatially separate from the evaporator unit (11) and spatially separate from the switch cabinet (10), the evaporator unit (11) connected to the condenser unit (30) by an incoming refrigerant line (21) and an outgoing refrigerant line (22) that bridge a free space between the evaporator unit (11) and the condenser unit (30), couplings (23) having two coupling elements installed into the incoming and the outgoing refrigerant lines (21, 22), each said coupling element connected to an end of one of the incoming and the outgoing refrigerant lines (21, 22) in a pressure-tight manner, and the two coupling elements of one of the couplings (23) one of connected and separated by a rapid-action closure;

wherein the evaporator unit (11) has a housing that accommodates the evaporator (13) and is one of attached to the switch cabinet (10) and positioned in the switch cabinet, the housing has a central air inlet opening (19) through which the air of the switch cabinet interior is conveyed into the housing, air outlet openings (18) through which the cooled air is conveyed from the housing into the switch cabinet interior are arranged laterally of the air inlet opening (19), and the air outlet openings (18) have an adjustable air flow control that varies at least one of an air flow direction and a quantity of air conveyed.

2. In the switch cabinet according to claim 1, wherein the incoming and outgoing refrigerant lines (21, 22) each is in a form of a flexible conduit.

3. In the switch cabinet according to claim 2, wherein the evaporator unit (11) contains a condensate collector (15) and an associated condensate evaporating device (16).

4. In the switch cabinet according to claim 3, wherein the condenser unit (30) contains at least one of a compressor (32) and an injection unit of at least one of a cooling circuit and an expansion valve (35).

5. In the switch cabinet according to claim 4, wherein the couplings (23) for the incoming and outgoing refrigerant lines (21, 22) are rigidly coupled to one of: the housing of one of the evaporator unit (11) and the condenser unit (33); and to flexible conduits.

6. In the switch cabinet according to claim 5, wherein the compressor (32) has a monitoring device that determines a power consumption of the compressor (32) at one of certain intervals and continuously, and switches off the compressor (32) when a preset fixed value is exceeded.

7. In the switch cabinet according to claim 6, wherein a distribution element for connecting at least two evaporator units (11) to the condenser unit (30) is installed in the incoming and the outgoing refrigerant lines (21, 22).

8. In the switch cabinet according to claim 1, wherein the evaporator unit (11) contains a condensate collector (15) and an associated condensate evaporating device (16).

9. In the switch cabinet according to claim 1, wherein the condenser unit (30) contains at least one of a compressor (32) and an injection unit of at least one of a cooling circuit and an expansion valve (35).

10. In the switch cabinet according to claim 1, wherein the couplings (23) for the incoming and outgoing refrigerant lines (21, 22) are rigidly coupled to one of: the housing of one of the evaporator unit (11) and the condenser unit (33); and to flexible conduits.

11. In a switch cabinet or enclosure with an air-conditioning unit that contains a cooling circuit system with an evaporator and a condenser, wherein the evaporator has an integral air circuit spatially connected to an interior of the switch cabinet and through which air of the switch cabinet interior is conveyed by a blower, and wherein the evaporator is connected to remaining components of the cooling circuit by refrigerant lines, the improvement comprising: the evaporator (13) and a dedicated blower (14) integrated into an evaporator unit (11) arranged on the switch cabinet (10), the condenser (33) and a dedicated blower (36) integrated into a condenser unit (30), the condenser unit (30) arranged spatially separate from the evaporator unit (11) and spatially separate from the switch cabinet (10), the evaporator unit (11) connected to the condenser unit (30) by an incoming refrigerant line (21) and an outgoing refrigerant line (22) that bridge a free space between the evaporator unit (11) and the condenser unit (30), couplings (23) having two coupling elements installed into the incoming and the outgoing refrigerant lines (21, 22), each said coupling element connected to an end of one of the incoming and the outgoing refrigerant lines (21, 22) in a pressure-tight manner, and the two coupling elements of one of the couplings (23) one of connected and separated by a rapid-action closure;

wherein a compressor (32) of the condenser unit (30) has a monitoring device that determines a power consumption of the compressor (32) at one of certain intervals and continuously, and switches off the compressor (32) when a preset fixed value is exceeded.

12. In the switch cabinet according to claim 1, wherein a distribution element for connecting at least two evaporator units (11) to the condenser unit (30) is installed in the incoming and the outgoing refrigerant lines (21, 22).

13. In the switch cabinet according to claim 1, wherein a compressor (32) of the condenser unit (30) has a monitoring device that determines a power consumption of the compressor (32) at one of certain intervals and continuously, and switches off the compressor (32) when a preset fixed value is exceeded.

14. In the switch cabinet according to claim 11, wherein the evaporator unit (11) contains a condensate collector (15) and an associated condensate evaporating device (16).

15. In the switch cabinet according to claim 11, wherein the condenser unit (30) contains an injection unit of at least one of a cooling circuit and an expansion valve (35).

16. In the switch cabinet according to claim 11, wherein the couplings (23) for the incoming and outgoing refrigerant lines (21, 22) are rigidly coupled to one of: a housing of one of the evaporator unit (11) and the condenser unit (33); and to flexible conduits.

17. In the switch cabinet according to claim 11, wherein a distribution element for connecting at least two evaporator units (11) to the condenser unit (30) is installed in the incoming and the outgoing refrigerant lines (21, 22).

* * * * *